(12) United States Patent
Redano

(10) Patent No.: US 6,739,547 B2
(45) Date of Patent: May 25, 2004

(54) MOBILE BALLISTIC MISSILE DETECTION AND DEFENSE SYSTEM

(76) Inventor: Richard T. Redano, 4417 Mildred St., Bellaire, TX (US) 77401

( * ) Notice: Subject to any disclaimer, the term of this patent is extended or adjusted under 35 U.S.C. 154(b) by 0 days.

(21) Appl. No.: 10/375,746

(22) Filed: Feb. 26, 2003

(65) Prior Publication Data

US 2004/0021033 A1 Feb. 5, 2004

Related U.S. Application Data

(63) Continuation of application No. 09/955,648, filed on Sep. 18, 2001, now Pat. No. 6,527,222.

(51) Int. Cl.[7] ............................. F41G 7/00; F42B 15/01
(52) U.S. Cl. ..................... 244/3.14; 244/3.1; 244/3.11; 244/3.15; 244/3.19; 342/62; 342/195
(58) Field of Search ..................... 244/3.1–3.3; 89/1.11, 89/1.818; 342/52–59, 60–68, 73–76, 89–103, 175, 195; 250/203.2

(56) References Cited

U.S. PATENT DOCUMENTS

| | | | | |
|---|---|---|---|---|
| 3,951,359 A | * | 4/1976 | Willhite | 244/3.14 |
| 3,982,713 A | * | 9/1976 | Martin | 244/3.1 |
| 4,925,129 A | * | 5/1990 | Salkeld et al. | 244/3.11 |
| 5,340,056 A | * | 8/1994 | Guelman et al. | 244/3.16 |
| 5,464,174 A | * | 11/1995 | Laures | 244/3.11 |
| 5,757,310 A | * | 5/1998 | Millward | 342/95 |
| 5,862,496 A | * | 1/1999 | Biven | 244/3.11 |
| 6,209,820 B1 | * | 4/2001 | Golan et al. | 244/3.15 |
| 6,265,704 B1 | * | 7/2001 | Livingston | 250/203.2 |
| 6,527,222 B1 | * | 3/2003 | Redano | 244/3.14 |
| 6,543,716 B1 | * | 4/2003 | Miller et al. | 244/3.21 |
| 6,549,158 B1 | * | 4/2003 | Hanson | 342/89 |
| 6,561,074 B1 | * | 5/2003 | Engel et al. | 89/1.818 |
| 6,563,450 B1 | * | 5/2003 | Wallace | 342/62 |
| 6,568,628 B1 | * | 5/2003 | Curtin et al. | 244/3.14 |
| 6,575,400 B1 | * | 6/2003 | Hopkins et al. | 244/3.19 |

FOREIGN PATENT DOCUMENTS

| | | | | |
|---|---|---|---|---|
| EP | 0655599 A1 | * | 5/1995 | F41G/7/22 |
| GB | 2107834 A | * | 5/1983 | F41G/3/00 |

* cited by examiner

Primary Examiner—Bernarr E. Gregory

(57) ABSTRACT

The present invention is directed towards a ballistic missile detection and defense system. The system of the present invention comprises a ship based interceptor or antiballistic missile, a missile launch detection system, a missile tracking system, and a ship based signal processing system capable of receiving said tracking signal calculating an intercept trajectory for an antiballistic missile to intercept a ballistic missile, and further capable of outputting an intercept trajectory program to an antiballistic missile.

20 Claims, 2 Drawing Sheets

MOBILE BALLISTIC MISSILE DETECTION AND DEFENSE SYSTEM

REFERENCES TO RELATED APPLICATIONS

This application is a continuation of application Ser. No. 09/955,648 filed Sep. 18, 2001 now U.S. Pat. No. 6,527,222.

BACKGROUND OF THE INVENTION

1. Field of the Invention

The present invention is directed towards a ballistic missile detection and defense system. The system of the present invention comprises a ship based interceptor or antiballistic missile, a missile launch detection system, a missile tracking system, and a ship based signal processing system capable of receiving said tracking signal calculating an intercept trajectory for an antiballistic missile to intercept a ballistic missile, and further capable of outputting an intercept trajectory program to an antiballistic missile.

2. Description of the Prior Art

The trajectory of a long range ballistic missile will follow an arc like path. The initial one third of the arc comprises the path of the missile from immediately after it is fired as it ascends toward its target along the arc like trajectory. The middle third portion of the arc comprises the zenith of the missile's trajectory, when the missile trajectory switches from ascending to descending. The final third of the arc comprises the missile's descent toward, and impact with, its target. Ballistic missile detection and defense systems or antiballistic missile ("ABM") systems may be divided into categories based upon the intended portion of the ballistic missile's arc trajectory where interception is intended to occur. This method of classification is referred to herein as "trajectory trisection."

Prior art ABM systems have been directed toward intercepting ballistic missiles as they are descending toward their target in the final phase of the trajectory trisection category. One such system is disclosed in U.S. Pat. No. 5,757,310 to Millard. One of the benefits of such a system is that significant time is available to track the incoming ballistic missiles, calculate their trajectory, and distinguish decoys from actual ballistic missiles.

One of the major drawbacks of such a system is that the incoming ballistic missile is relatively close to its target by the time such an ABM system launches an interceptor missile. If the interceptor missile misses or experiences a malfunction, inadequate time is left to take alternate defensive measures. In such a scenario, if the incoming ballistic missile contains a thermonuclear warhead, large scale destruction and radioactive contamination will result. If the incoming ballistic missile detonates near a population center, millions of lives may be lost and billions of dollars in property damage is likely to result. Thus, the risks associated with such a system appear to far exceed the benefits. Intercepting a ballistic missile at a point relatively close to the target presents danger to people and property in the target vicinity from falling debris resulting from a successful missile interception. Such drawbacks are discussed in U.S. Pat. No. 5,340,056 to Guelman et al.

Other ABM systems are directed toward intercepting ballistic missiles in the middle phase of their trajectory trisection category. One such system is disclosed in Jun. 20, 2000 documents published by the United States Department of Defense ("USDoD"). These documents disclose an ABM system intended to launch a land based "kill vehicle" intended to intercept an incoming ballistic missile in mid-course. Under the presidential administration of William Clinton, this system represented the choice of the USDoD for the National Missile Defense ("NMD") system. Such a system provides less time to evaluate the trajectory of the incoming ballistic missile than a final phase trajectory trisection system, such as the one disclosed in the Millard patent, discussed above. Alternatively, such a system provides more time to evaluate the trajectory of the incoming ballistic missile than an initial phase trajectory trisection system.

ABM systems may be particularly well suited for defending against small scale ballistic missile attacks such as those which the USDoD believes will be possible by the year 2005 from small nations, such as North Korea. Such nations are referred to by the USDoD as "rogue nations" in a Jan. 20, 1999 DoD News Briefing by Secretary of Defense William S. Cohen, published by the USDoD.

ABM systems may also be classified according to whether the interceptor missile, detection systems or control systems is land based or nonland based. Land or ground based systems are disclosed in the Millard patent, in USDoD news briefings describing the NMD system, and in U.S. Pat. No. 5,340,056 to Guelman et al. and U.S. Pat. No. 5,464,174 to Laures.

There are several disadvantages to land based systems. One disadvantage of land based systems is the limited geographic area which they can cover. A simple land based system intended to protect the population centers and military installations of the west coast of the lower 48 states of the United States would have to cover a coastline stretching approximately 1,100 miles, from the Mexican border to the Canadian border. If such a system is to be a final phase trajectory trisection system, such as the one disclosed in Millard, multiple land based antiballistic missile sites must be employed to protect the intended target zone. If one expands the target zone to encompass the entire continental United States, the cost of land based final phase trajectory trisection systems may be cost prohibitive.

Another disadvantage of a land based system is lack of mobility. The majority earth is covered by ocean and our entire planet is covered by atmosphere and space. Thus, an ocean or spaced based system provides much greater deployment flexibility than a land based system, including systems who have one or more components based on land. Additionally, the geographic dispersion of rogue states, such as North Korea or Iraq makes mobility an extremely valuable asset in an ABM system.

DESCRIPTION OF THE PREFERRED EMBODIMENTS

The present invention is directed toward a mobile ballistic missile detection and defense system. The system of the present invention is nonland based and is classified as an initial phase trajectory trisection system.

One advantage of a nonland based system is that it may be based on a ship, such as a naval warship. In a preferred embodiment, the invention is based on an Aegis class carrier on the type currently deployed by the U.S. Navy. Such a system is mobile, thereby allowing it to be deployed in the vicinity of the greatest perceived ballistic missile threat. The location of such a threat will likely change over time in response to changing political, economic, military, and/or conditions.

Another advantage of a nonland based system is that it may be deployed relatively close to the launch site of the ballistic missile, thereby minimizing the area which it must cover. For example, a naval warship comprising the ABM of the present invention may be deployed 250 miles of the coast of North Korea. The total distance from the northern border to the southern border of North Korea is less than 350 miles. A single naval warship may be positioned to launch an ABM capable of intercepting a ballistic missile launched from a rogue state, such as North Korea, toward the continental United States. This provides a significant cost advantage over many ground based systems.

Figure 1:
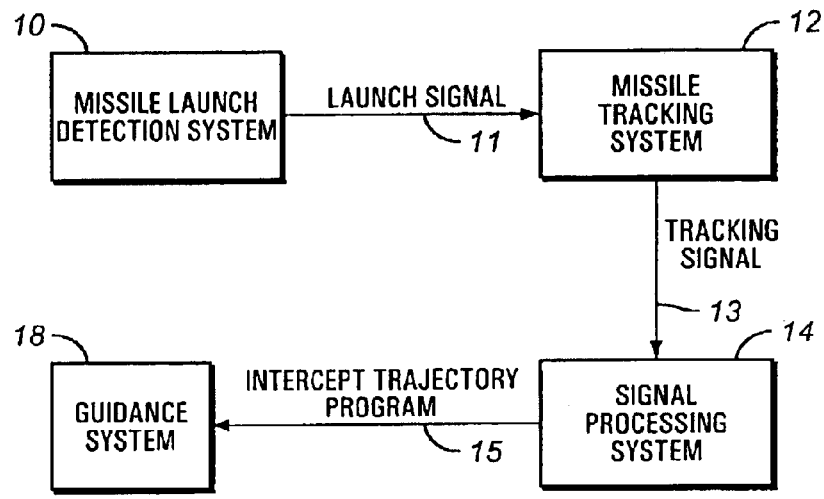
FIG. 1 is a systems block diagram of a first embodiment of the present invention.
Figure 2:
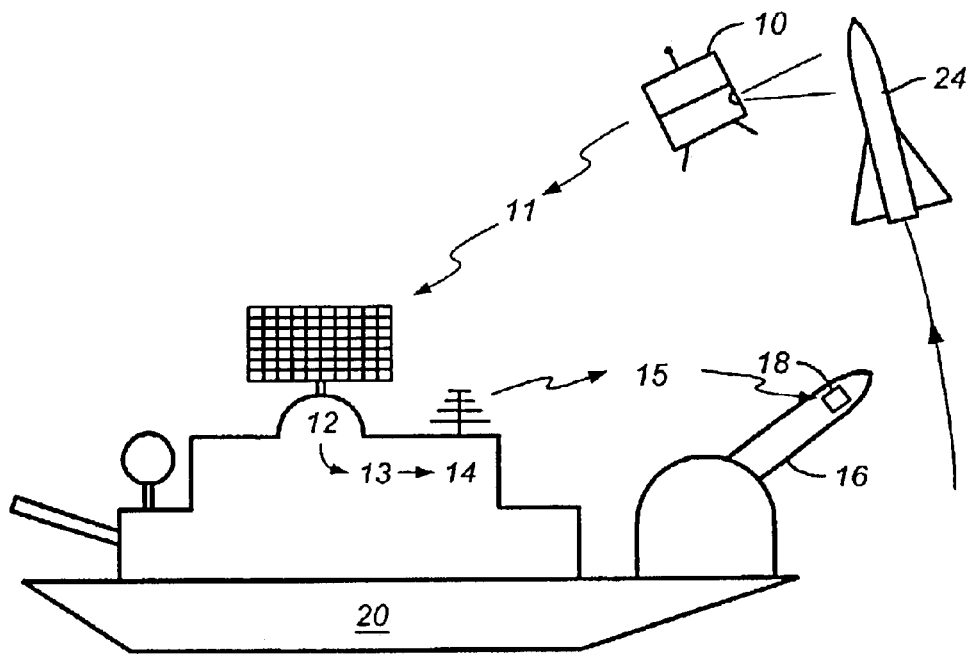
FIG. 2 is a side view of a first embodiment of the present invention.

The invention comprises a missile launch detection system 10 capable of detecting the time and location of the launch of a ballistic missile 24 and of outputting a launch signal 11 indicative of a detected missile launch as shown in FIGS. 1 and 2. In a preferred embodiment the missile launch and detection system is located on a satellite orbiting the earth. In another preferred embodiment, the missile launch and detection system comprises a high resolution imaging system or an infrared detection system. In a preferred embodiment, the missile launch detection system is also capable of determining the location of the missile launch. Such a determination may be made by any means known in the art of military intelligence, including, but not limited to global positioning satellite surveillance The invention further comprises a missile tracking system 12 capable of receiving a launch signal from said launch detection system, tracking a missile in flight, and outputting a tracking signal 13 indicative of the velocity and trajectory of a missile in flight, as shown in FIG. 1. In a preferred embodiment the missile tracking system comprises a radar tracking system as shown in FIG. 2, or an infrared tracking system. In a preferred embodiment, the missile tracking system is also capable of determining the location of the missile launch by reverse extrapolation of the ballistic missile's trajectory. In this embodiment, the tracking signal also comprises information indicative of the launch site location.

In a preferred embodiment, the missile tracking system is located on a ship capable of traveling through a fluid. In a preferred embodiment, the missile tracking system is an AN/SPY series radar system of the type deployed on U.S. Navy Aegis cruisers. The missile tracking system may be used in conjunction with global positioning satellite ("GPS") technology. Suitable GPS related missile tracking systems are disclosed in U.S. Pat. No. 6,278,945 to Lin, and U.S. Pat. No. 6,232,922 to McIntosh. The full disclosures of these U.S. Patents are incorporated herein by reference.

In a preferred embodiment, the tracking signal is a microwave signal. In another preferred embodiment, the tracking signal is a UHF signal.

Figure 4:
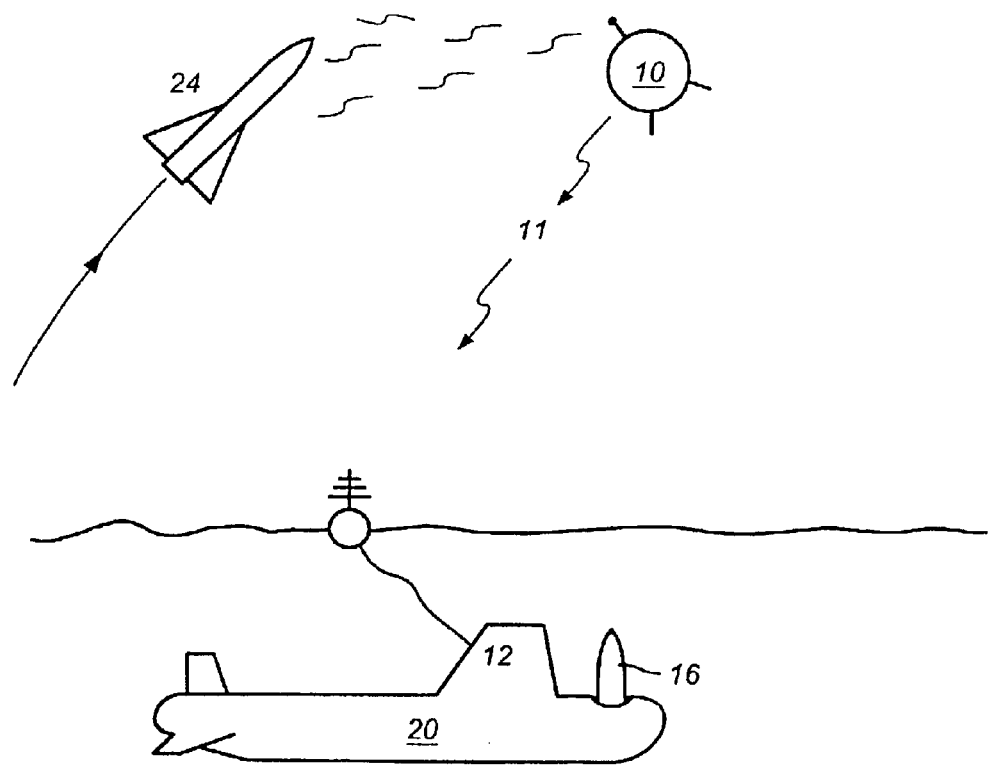
FIG. 4 Is a side view of a second embodiment of the present invention.

The invention further comprises a ship 20 capable of traveling through a fluid, as shown in FIG. 2. In one preferred embodiment, the ship is an ocean faring surface vessel, such as an Aegis class carrier. In another preferred embodiment, the ship is a submarine, as shown in FIG. 4. In such embodiments, the submarine must be capable of receiving signals from the missile tracking system. A communication system suitable for use between a submarine and a satellite is disclosed in U.S. Pat. No. 5,974,315. The full disclosures of this U.S. Patent is incorporated herein by reference. In another preferred embodiment, the ship is a satellite. In another preferred embodiment, the ship is a satellite in geosynchronous orbit about the earth.

The invention further comprises a signal processing system 14 located on the ship and capable of receiving said tracking signal, calculating an intercept trajectory for an antiballistic missile to intercept a missile having a trajectory as described by the tracking signal, and further capable of outputting an intercept trajectory program 15 to an antiballistic missile, as shown in FIGS. 1 and 2. In a preferred embodiment, the signal processing system is an AN/SPY series radar system. In a preferred embodiment where the tracking signal comprises information indicative of the ballistic missile launch site location, the intercept trajectory may be a trajectory for an interceptor missile to destroy the ballistic missile launch site. In a preferred embodiment, such an interceptor missile comprises a warhead with an explosive yield in excess of 100 kilotons of TNT.

In a preferred embodiment, the intercept trajectory is a trajectory that is neither aligned with, nor parallel to, the trajectory of the ballistic missile to be intercepted. Such an intercept trajectory is referred to herein as a "nonaligned intercept trajectory." An aligned intercept trajectory ABM system is disclosed in U.S. Pat. No. 6,209,820 to Golan et al. A nonaligned intercept trajectory comprises less directional changes than an aligned intercept trajectory.

Figure 3:
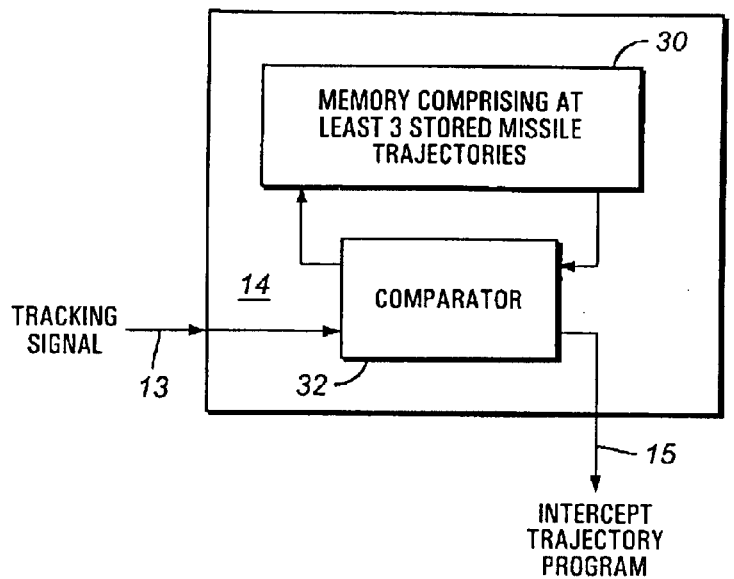
FIG. 3 is a block diagram of a preferred embodiment of the signal processing system of the present invention.

In a preferred embodiment, the signal processing system further comprises a memory 30 comprising at least 3 stored missile trajectories between selected origin points and selected targets in the United States, as shown in FIG. 3. This embodiment further comprises a comparator 32 capable of comparing trajectory data derived from said tracking signal to the stored missile trajectories, determining whether any of the stored missile trajectories match said tracking signal trajectory, and selecting a stored trajectory for which to calculate an intercept trajectory if a match is detected.

The invention further comprises an interceptor or antiballistic missile 16 located on the ship, as shown in FIG. 2. In a preferred embodiment, the antiballistic missile is an SM-2 extended range Standard Missile, Block IV, of the type deployed by the U.S. Navy and built by Hughes Missile Systems Company. Other antiballistic missiles suitable for use in practicing the present invention are disclosed in U.S. Pat. No. 5,464,174 to Lauren and U.S. Pat. No. 6,209,820. The full disclosures of these U.S. Patents are incorporated herein by reference.

In other preferred embodiments, multiple ships carrying signal processing systems and antiballistic missiles may be deployed in an optimal configuration to detect and defend against ballistic missile launches from hostile nations or rogue states. In this configuration, multiple signal processing units may receive a tracking signal from a central missile tracking system. Additionally, each ship may carry multiple antiballistic missiles and multiple signal processing systems.

Where there is a danger of multiple ballistic missiles being launched toward the United States, designated signal processing units can be configured to receive a tracking signal which is specific to a particular ballistic missile or to a preselected geographic region from which a ballistic missile launch is detected. Alternatively, certain signal processing units may be configured to receive a tracking signal indicative of a ballistic missile launch location and to produce an intercept trajectory program to guide the interceptor missile to the ballistic missile launch site, while other signal processing units may be configured to produce an intercept trajectory program, as described above.

The antiballistic missile comprises a guidance system 18 capable of receiving an intercept program from said signal processing system, as shown in FIGS. 1 and 2. In one preferred embodiment, the guidance system is a passive system. In another preferred embodiment, the guidance system is an active system. Active and passive missile tracking and guidance systems are described in U.S. Pat. No. 5,569,567 to Hallmark. The full disclosure of the Hallmark patent is incorporated herein by reference.

The foregoing disclosure and description of the invention are illustrative and explanatory. Various changes in the size, shape, and materials, as well as in the details of the illustrative construction may be made without departing from the spirit of the invention.

What is claimed is:

1. A mobile ballistic missile detection and defense system, comprising:
   a. a nonland based missile launch detection system configured to detect a missile launch and output a launch signal indicative of a detected missile launch;
   b. a nonland based missile tracking system configured to receive a launch signal from said launch detection system, track a missile in flight, and output a tracking signal indicative of the trajectory of a missile in flight;
   c. a ship;
   d. a signal processing system configured to receive said tracking signal, calculate a nonaligned intercept trajectory for an antiballistic missile to intercept a missile having a trajectory as described by said tracking signal, and further output a nonaligned intercept trajectory program to an antiballistic missile; and
   e. an antiballistic missile located on said ship, said antiballistic missile comprising a guidance system configured to receive the nonaligned intercept trajectory program from said signal processing system and guide the antiballistic missile along the nonaligned intercept trajectory.

2. The system of claim 1, wherein:
   a. said launch detection system is a means for detecting a missile launch and outputting a launch signal indicative of a detected missile launch;
   b. said missile tracking system is a means for receiving a launch signal from said launch detection system, tracking a missile in flight, and outputting a tracking signal indicative of the trajectory of a missile in flight; and
   c. said signal processing system is a means for receiving said tracking signal, calculating a nonaligned intercept trajectory for an antiballistic missile to intercept a missile having a trajectory as described by said tracking signal, and further outputting a nonaligned intercept trajectory program to said antiballistic missile.

3. The system of claim 1, wherein said guidance system is an active system.

4. The system of claim 1, wherein said missile launch detection system is located on a satellite.

5. The system of claim 4, wherein said missile launch detection system comprises a high resolution imaging system.

6. The system of claim 4, wherein said missile launch detection system comprises an infrared detection system.

7. The system of claim 1, wherein said missile launch detection system comprises a radar tracking system.

8. A mobile ballistic missile detection and defense system, comprising:
   a. a nonland based missile launch detection and tracking system configured to detect the location of a missile launch, track a detected missile in flight, and output a tracking signal indicative of the trajectory of a launched missile in flight;
   b. a ship;
   c. a signal processing system configured to receive said tracking signal, calculate a nonaligned intercept trajectory for an antiballistic missile to intercept a missile having a trajectory as described by said tracking signal, and further output the nonaligned intercept trajectory program to an antiballistic missile; and
   d. an antiballistic missile located on said ship, said antiballistic missile comprising a guidance system configured to receive the nonaligned intercept trajectory program from said signal processing system and guide the antiballistic missile along the nonaligned intercept trajectory.

9. The system of claim 8, wherein said missile launch detection and tracking system is located on a satellite.

10. The system of claim 9, wherein said missile launch detection and tracking system comprises a high resolution imaging system.

11. The system of claim 9, wherein said missile launch detection and tracking system comprises an infrared detection system.

12. The system of claim 8, wherein said missile launch detection and tracking system comprises a radar tracking system.

13. The system of claim 8, wherein said guidance system is an active system.

14. The system of claim 8, wherein:
   a. said missile launch detection and tracking system is a means for detecting the location of a missile launch, tracking a detected missile in flight, and outputting a tracking signal indicative of the trajectory of a launched missile in flight; and
   b. said signal processing system is a means for receiving said tracking signal, calculating a nonaligned intercept trajectory for an antiballistic missile to intercept a missile having a trajectory as described by said tracking signal, and further outputting a nonaligned intercept trajectory program to said antiballistic missile.

15. A mobile ballistic missile detection and defense system, comprising:
   a. a nonland based missile launch detection and tracking system configured to detect the location of a missile launch, tracking a detected missile in flight, and output a tracking signal indicative of the trajectory of a launched missile in flight;
   b. a ship;
   c. a signal processing system located on said ship configured to receive said tracking signal, calculate a nonaligned intercept trajectory for an antiballistic missile to intercept a missile having a trajectory as described by said tracking signal, and further output the nonaligned intercept trajectory program to an antiballistic missile; and
   d. an antiballistic missile located on said ship, said antiballistic missile comprising a guidance system configured to receive the nonaligned intercept trajectory program from said signal processing system and guide the antiballistic missile along the nonaligned intercept trajectory.

16. The system of claim 15, wherein said missile launch detection and tracking system is located on said ship.

17. The system of claim 16, wherein said missile launch detection and tracking system comprises a radar tracking system.

18. The system of claim 15, wherein:
   a. said missile launch detection and tracking system is a means for detecting the location of a missile launch, tracking a detected missile in flight, and outputting a tracking signal indicative of the trajectory of a launched missile in flight; and
   b. said signal processing system is a means for receiving said tracking signal, calculating a nonaligned intercept trajectory for an antiballistic missile to intercept a missile having a trajectory as described by said tracking signal, and further outputting a nonaligned intercept trajectory program to said antiballistic missile.

19. The system of claim 15, wherein said ship is an Aegis class cruiser.

20. The system of claim 15, wherein said missile launch detection and tracking system is located on a satellite.

* * * * *